(12) United States Patent
Neelakantan et al.

(10) Patent No.: US 10,190,685 B2
(45) Date of Patent: Jan. 29, 2019

(54) PARK CONTROL SYSTEM FOR A VEHICLE TRANSMISSION

(71) Applicant: GM GLOBAL TECHNOLOGY OPERATIONS LLC, Detroit, MI (US)

(72) Inventors: Vijay A Neelakantan, Rochester Hills, MI (US); Christopher G Benson, Rochester Hills, MI (US)

( * ) Notice: Subject to any disclaimer, the term of this patent is extended or adjusted under 35 U.S.C. 154(b) by 275 days.

(21) Appl. No.: 15/294,872

(22) Filed: Oct. 17, 2016

(65) Prior Publication Data
US 2018/0106370 A1    Apr. 19, 2018

(51) Int. Cl.
| F16H 63/34 | (2006.01) |
| F16H 1/06  | (2006.01) |
| F16H 21/44 | (2006.01) |
| F16H 35/18 | (2006.01) |

(52) U.S. Cl.
CPC ........... F16H 63/3466 (2013.01); F16H 1/06 (2013.01); F16H 21/44 (2013.01); F16H 35/18 (2013.01); F16H 63/3475 (2013.01)

(58) Field of Classification Search
CPC .. F16H 63/3458; F16H 21/44; F16H 63/3466; F16H 63/3475
See application file for complete search history.

(56) References Cited

U.S. PATENT DOCUMENTS

| 5,827,149 | A  | * | 10/1998 | Sponable ........... F16H 63/3466 |
|           |    |   |         | 477/92 |
| 6,983,668 | B2 |   | 1/2006  | Powell et al. |
| 8,053,691 | B2 |   | 11/2011 | Vernacchia et al. |
| 9,321,435 | B2 |   | 4/2016  | Landino et al. |
| 9,435,428 | B2 |   | 9/2016  | Neelakantan et al. |
| 2010/0206677 | A1 | * | 8/2010 | Shiraki .................. B60T 13/741 |
|           |    |   |         | 188/325 |
| 2011/0203899 | A1 | * | 8/2011 | Weifels ............... F16H 63/3433 |
|           |    |   |         | 192/219.5 |
| 2012/0067153 | A1 | * | 3/2012 | Komatsu ................. F16H 61/32 |
|           |    |   |         | 74/473.12 |
| 2016/0069451 | A1 |   | 3/2016  | McDonough et al. |
| 2016/0207746 | A1 | * | 7/2016 | Heil ........................ F16D 41/12 |
| 2016/0244035 | A1 | * | 8/2016 | Yasui ...................... B60T 7/122 |
| 2017/0219098 | A1 | * | 8/2017 | Kokubu .................. B60T 1/005 |

FOREIGN PATENT DOCUMENTS

WO    WO-2011161719 A1  *  12/2011  ............. B60T 1/005

\* cited by examiner

*Primary Examiner* — Stacey A Fluhart

(57) ABSTRACT

A vehicle includes a prime mover in communication with an input shaft of a transmission, an output shaft of the transmission in communication with a final drive and drive wheels, a park actuator system internal to a housing of the transmission and a park control system mounted to an external surface of the housing of the transmission with a pivot shaft extending through the housing that connects to the park actuator system to selectively place the park actuator system in one of a park configuration and an out of park configuration.

10 Claims, 5 Drawing Sheets

PARK CONTROL SYSTEM FOR A VEHICLE TRANSMISSION

FIELD

The present disclosure relates to a park control system for a vehicle transmission.

INTRODUCTION

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

A typical automatic transmission includes a hydraulic control system that is employed to provide cooling and lubrication to components within the transmission and to actuate a plurality of torque transmitting devices. These torque transmitting devices may be, for example, friction clutches and brakes arranged with gear sets or in a torque converter. The conventional hydraulic control system typically includes a main pump that provides a pressurized fluid, such as oil, to a plurality of valves and solenoids within a valve body. The main pump is driven by the engine of the motor vehicle. The valves and solenoids are operable to direct the pressurized hydraulic fluid through a hydraulic fluid circuit to various subsystems including lubrication subsystems, cooler subsystems, torque converter clutch control subsystems, and shift actuator subsystems that include actuators that engage the torque transmitting devices. The pressurized hydraulic fluid delivered to the shift actuators is used to engage or disengage the torque transmitting devices in order to obtain different gear ratios.

The transmission generally operates in a plurality of modes of operation including out-of-Park driving modes and a Park mode. The out-of-Park driving modes generally include the forward gear or speed ratios (i.e. a Drive mode), at least one reverse gear or speed ratio (i.e. a Reverse mode), and a Neutral mode. Selection of the various driving modes is typically accomplished by engaging a shift lever or other driver interface device that is connected by a shifting cable or other mechanical connection to the transmission.

Alternatively, the selection of a driving mode may be controlled by an electronic transmission range selection (ETRS) system, also known as a "shift by wire" system. In an ETRS system, selection of the driving modes is accomplished through electronic signals communicated between the driver interface device and the transmission. The ETRS system reduces mechanical components, increases instrument panel space, enhances styling options, and eliminates the possibility of shifting cable misalignment with transmission range selection levers. New propulsion system architectures may no longer rely upon clutches and, thus, may no longer incorporate a hydraulic control system.

These control systems must meet specific safety requirements for new transmission and vehicle designs during particular failure modes of operation. In the absence or reduced availability of hydraulic systems in these new propulsion system architectures, these safety related functions are typically met by mounting a system external to the housing of the transmission. A shaft may extend out of the transmission housing and is connected to this external system. This external system must provide the ability to place the transmission into multiple different configurations including park, reverse, neutral, drive, and low configurations. Since this external component is required to provide the ability to accommodate all of the transmission configurations, the external component typically is bulky, complex, and is quite expensive. Further, these existing system rely upon internal capacitor or energy stores to positively latch or de-latch mechanisms in order to transition between configurations. These energy stores can fail and become unreliable and their mere presence adds significant complexity and resultant cost.

SUMMARY

In an exemplary aspect, a vehicle includes a prime mover in communication with an input shaft of a transmission, an output shaft of the transmission in communication with a final drive and drive wheels, a park actuator system internal to a housing of the transmission, and a park control system mounted to an external surface of the housing of the transmission with a pivot shaft extending through the housing that connects to the park actuator system to selectively place the park actuator system in one of a park configuration and an out of park configuration.

In another exemplary aspect, the park control system includes a pair of separate and independently operable park inhibit solenoids that are operable to hold the park control system in an out of park configuration.

In another exemplary aspect, the park control system further includes a PISA lever pivotally mounted on the pivot shaft.

In another exemplary aspect, each of the pair of park inhibit solenoids are energizable to hold their corresponding solenoid shafts in an extended position to prevent rotation of the PISA lever on the pivot mount from the out of park configuration toward a park configuration.

In another exemplary aspect, the PISA lever includes a solenoid shaft ramp that is oriented to push a corresponding solenoid shaft to a withdrawn configuration when the PISA lever rotates from the out of park configuration toward the park configuration.

In another exemplary aspect, the park control system further includes a park return spring that biases the PISA lever to rotate from the out of park configuration to the park configuration.

In another exemplary aspect, the park control system further includes, a motor with an output shaft, a pinion gear mounted on the output shaft, and a gear meshing with the pinion gear and mounted on the pivot shaft.

In another exemplary aspect, the park control system further includes a position sensor mounted on the pivot shaft that outputs a signal indicating when the PISA lever is in the out of park configuration.

In another exemplary aspect, the park inhibit solenoids are responsive to the signal from the position sensor indicating an out of park configuration for the PISA lever to energize and hold their corresponding solenoid shafts in an extended position.

In this manner, an elegant, non-complex system is provided which reliably meets the requirements of defaulting to park in a complete power loss situation; maintaining an out-of-park configuration when desired despite a single element failure; and maintaining the motive ability to move between the out-of-park configuration and park configuration and vice-versa on command.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the present invention are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Figure 1:
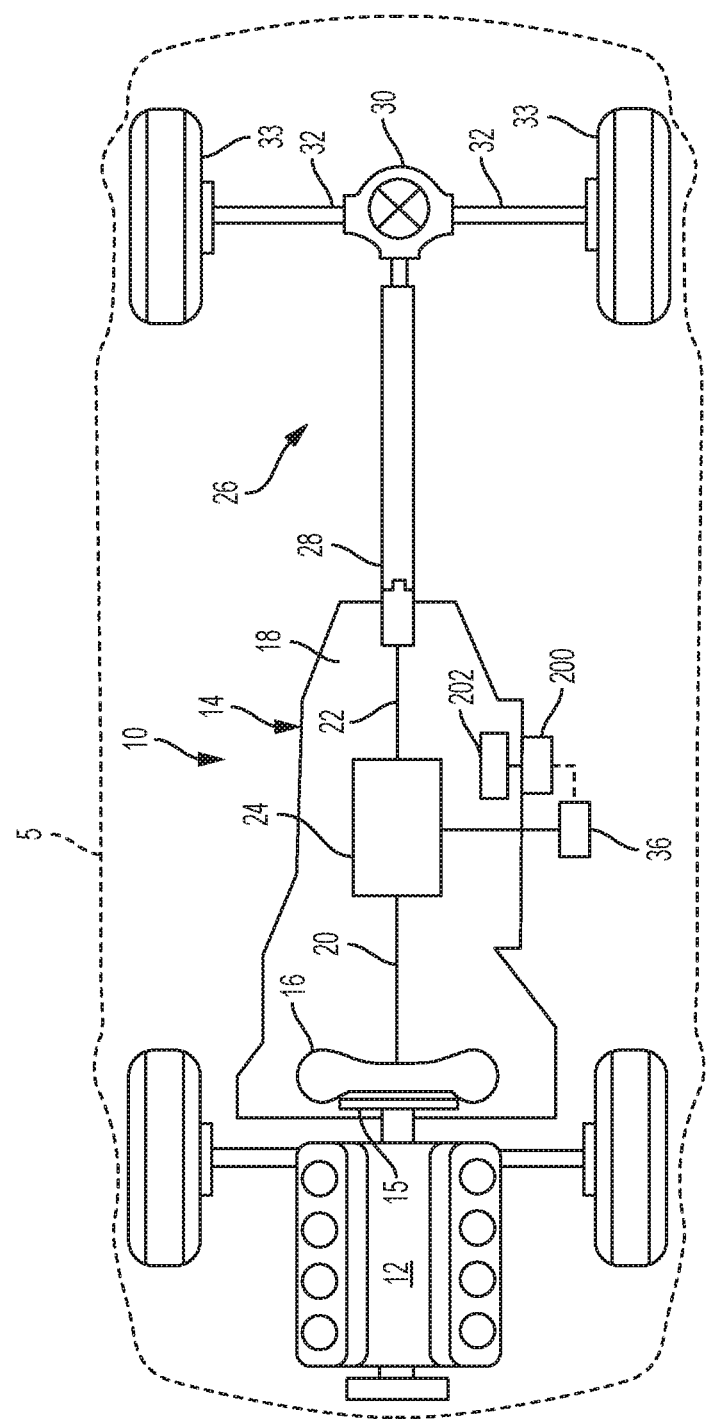
FIG. 1 is a schematic diagram of an exemplary propulsion system in a vehicle.
Figure 2:
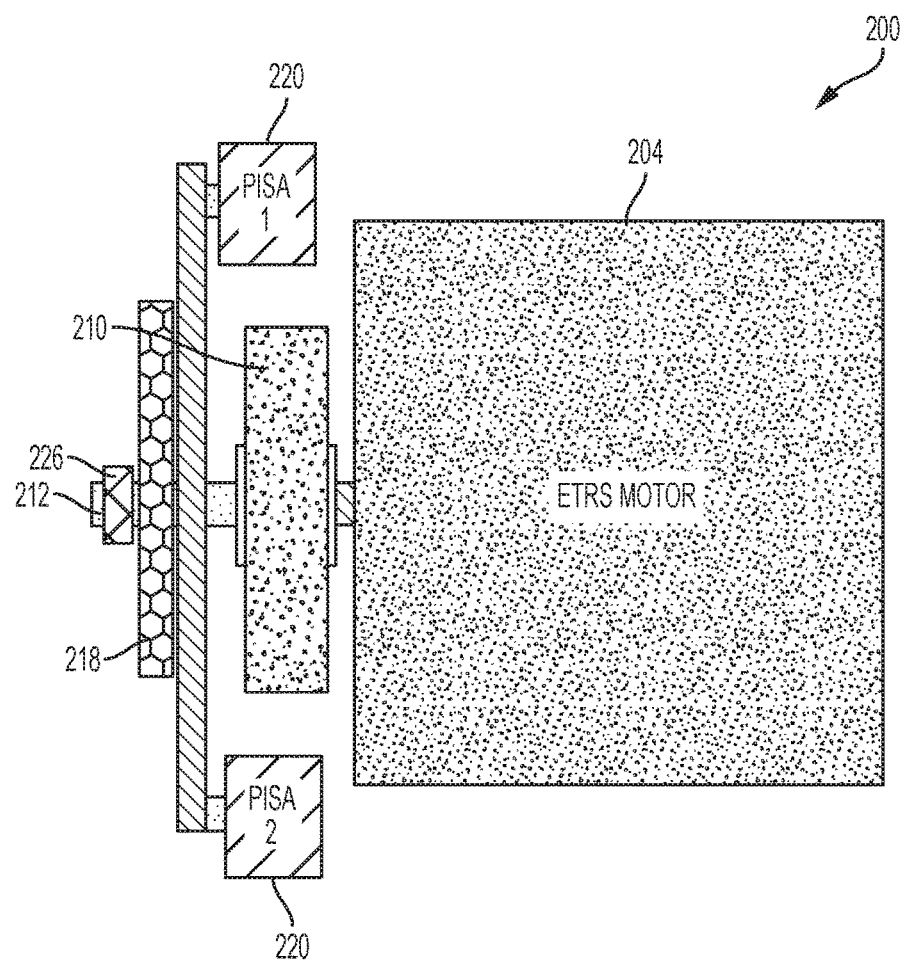
FIG. 2 is a schematic diagram of an exemplary park control system.

With reference to FIG. 1, a vehicle is illustrated and generally indicated by reference number 5. The vehicle 5 is illustrated as a passenger car, but it should be appreciated that the vehicle 5 may be any type of vehicle, such as a truck, van, sport-utility vehicle, etc. The vehicle 5 includes an exemplary propulsion system 10. It should be appreciated at the outset that while a rear-wheel drive propulsion system has been illustrated, the vehicle 5 may have a front-wheel drive propulsion system without departing from the scope of the present invention. The propulsion system 10 generally includes a prime mover 12 interconnected with a transmission 14.

The prime mover 12 may be a conventional internal combustion engine or an electric engine, hybrid engine, or any other type of prime mover, without departing from the scope of the present disclosure. The prime mover 12 may supply a driving torque to the transmission 14 through a flex plate 15 or other connecting device that is connected to a starting device 16. The starting device 16 may be a hydrodynamic device, such as a fluid coupling or torque converter, a wet dual clutch, or an electric motor. It should be appreciated that any starting device between the prime mover 12 and the transmission 14 may be employed including a dry launch clutch.

The transmission 14 has a typically cast, metal housing 18 which encloses and protects the various components of the transmission 14. The housing 18 may include a variety of apertures, passageways, shoulders and flanges which position and support these components. Generally speaking, the transmission 14 includes a transmission input shaft 20 and a transmission output shaft 22. The transmission input shaft 20 is functionally interconnected with the engine 12 via the starting device 16 and receives input torque or power from the engine 12. Accordingly, the transmission input shaft 20 may be a turbine shaft in the case where the starting device 16 is a hydrodynamic device, dual input shafts where the starting device 16 is dual clutch, or a drive shaft where the starting device 16 is an electric motor. The transmission output shaft 22 may be connected with a final drive unit 26 which includes, for example, a prop shaft 28, differential 30, and drive axles 32 connected to wheels 33.

The gear and clutch arrangement 24 includes a plurality of gear sets, a plurality of clutches and/or brakes, and a plurality of shafts. The plurality of gear sets may include individual intermeshing gears, such as planetary gear sets, that are connected to or selectively connectable to the plurality of shafts through the selective actuation of the plurality of clutches/brakes. The plurality of shafts may include layshafts or countershafts, sleeve and center shafts, reverse or idle shafts, or combinations thereof. The clutches/brakes, indicated schematically by reference number 34, are selectively engageable to initiate at least one of a plurality of gear or speed ratios by selectively coupling individual gears within the plurality of gear sets to the plurality of shafts. It should be appreciated that the specific arrangement and number of the gear sets, clutches/brakes 34, and shafts within the transmission 14 may vary without departing from the scope of the present disclosure.

The transmission 18 includes a transmission control module 36. The transmission control module 36 is preferably an electronic control device having a preprogrammed digital computer or processor, control logic or circuits, memory used to store data, and at least one I/O peripheral. The control logic includes or enables a plurality of logic routines for monitoring, manipulating, and generating data and control signals. In another example, the transmission control module 36 is an engine control module (ECM), or a hybrid control module, or any other type of controller.

FIG. 1 also shows a schematic representation of a park control system 200 positioned external to the transmission housing 18 and in communication with the transmission control module 36. The park control system 200 is also connected to a park actuator system 202 that is positioned internal to the transmission housing 18. The park control system 200 interacts with the park actuator system 202 to selectively place the park actuator system 202 into one of a park configuration and an out of park configuration.

FIGS. 2-5, illustrate an exemplary park control system 200 in accordance with the invention. The park control system 200 includes a motor 204 with a motor output shaft 206. A pinion gear 208 is splined to the motor output shaft 206 and meshes with gear 210. The gear 210 is splined to a pivot shaft 212. A PISA lever 214 is also splined to the pivot shaft 212. In this manner, when the motor 204 actuates to rotate the motor output shaft 206, the pinion gear 208 and gear 210 cause the pivot shaft 212 to rotate in the opposite direction, but at a reduced speed and an increased torque.

Figure 3B:
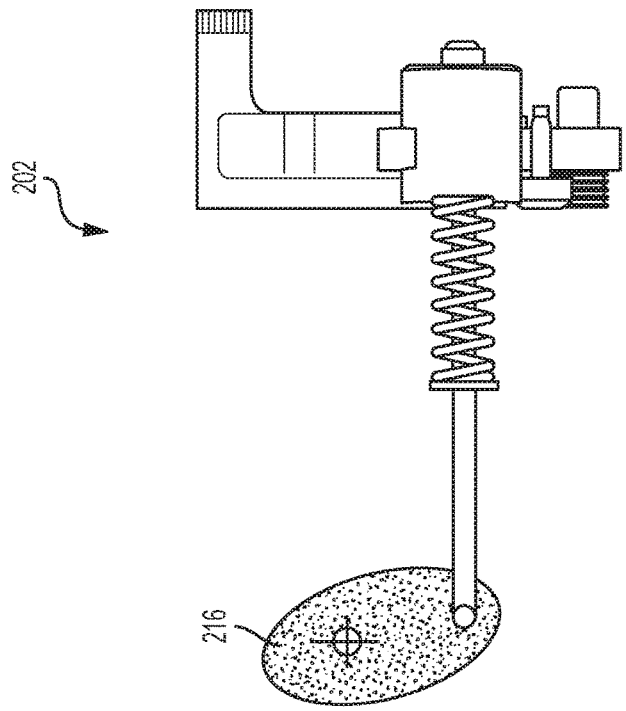
FIG. 3B is a schematic diagram of a park actuator system in a park configuration.
Figures 4A, 4B:
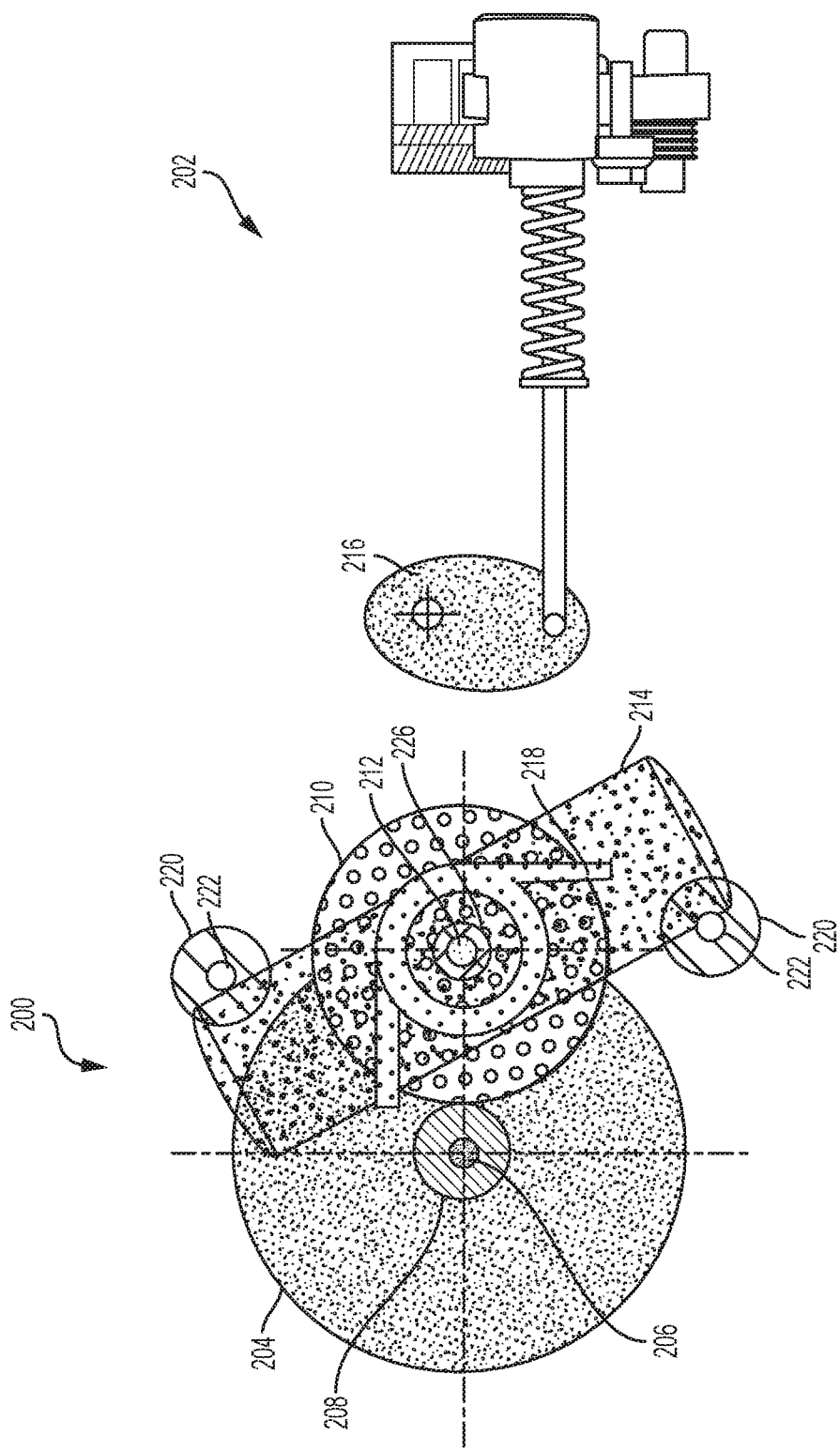
FIG. 4A is a schematic diagram of the park control system of FIG. 2 in an out-of-park configuration.
FIG. 4B is a schematic diagram of a park actuator system in an out-of-park configuration.
Figure 5:
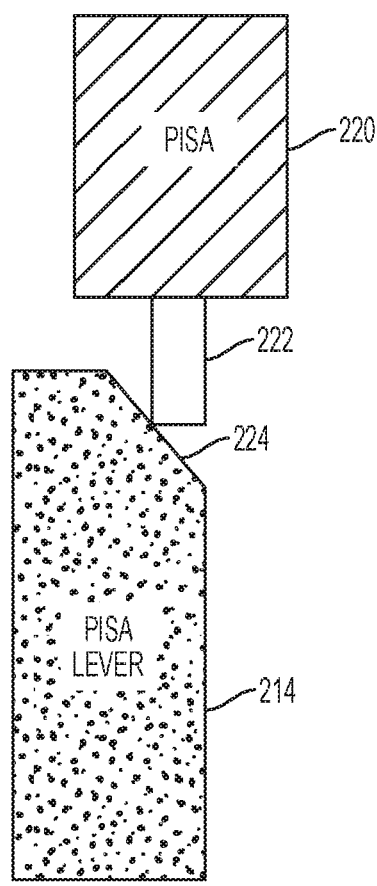
FIG. 5 is a close up schematic diagram of a portion of the park control system of FIG. 2.

The pivot shaft 212 extends into the transmission housing 18 and is connected to the park lever 216 of the park actuator system 202. The park actuator system 202 illustrated in FIGS. 43B and 4B are of a conventional, well known configuration. The park actuator system 202 is illustrated in a park configuration in FIG. 3B and an out-of-park configuration in FIG. 4B.

Figure 3A:
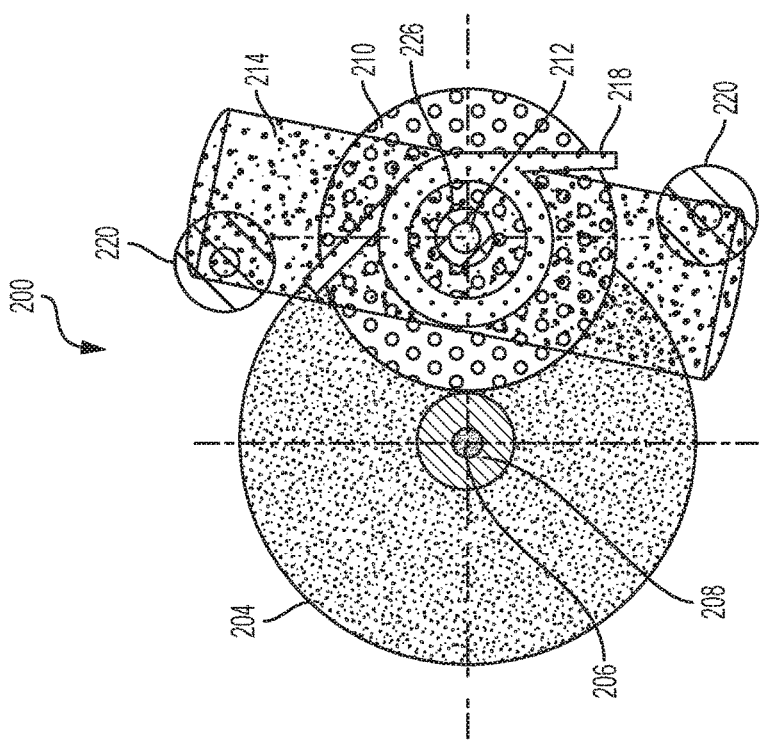
FIG. 3A is a schematic diagram of the park control system of FIG. 2 in a park configuration.

A park return spring 218 is a torsion spring that is concentrically mounted on the pivot shaft 212. The park return spring 218 biases the PISA lever 214 to rotate toward the park configuration as illustrated in FIGS. 3A and 3B. The park return spring 218 provides enough torque to the PISA lever 214 and, therefore to the park lever 216, to provide a default-to-park function.

The park control system 200 further includes a pair of separate and independently controlled park inhibit solenoids 220. Each park inhibit solenoid 220 includes a selectively extendable and retractable solenoid shaft 222. As is clearly illustrated in FIGS. 2 and 4A, the park inhibit solenoids 220 are fixedly positioned such that their respective solenoid shafts 222 are selectively extendable in the out-of-park configuration to block the rotation of the PISA lever 214 from rotating toward the park configuration (i.e. clockwise in the figures). In this manner, redundant, separate, and independent means are provided to maintain the park control system 200 in an out-of-park configuration. Loss of power or failure of any single element will not result in the park control system 200 moving from the out-of-park configuration to the park configuration absent being commanded to do so.

The park control system 200 further includes a position sensor 226 mounted on the pivot shaft 212. The position sensor 226 is operable to output a signal indicating the position or configuration of the park control system 200 which indicates whether the park control system 200 is in the park configuration or the out-of-park configuration. It is understood that while the exemplary embodiment illustrates a position sensor 226 mounted on the pivot shaft 226, any sensor positioned anywhere within park control system 200 which is capable of outputting a signal indicating the configuration of the park control system 200 may be used without limitation.

Operation of the park control system 200 will now be explained with reference to FIGS. 3A-5. The park return spring 218 biases the PISA lever 214 in a clockwise direction in FIG. 3A to hold the park control system 200 in a park configuration. In this configuration, the PISA lever 214 being splined to the pivot shaft 212 which, in turn, is splined to the park lever of the park actuator system 202 maintains the vehicle in a park configuration.

To move from the park configuration into the out of park configuration, the motor 204 is energized and applies a torque to rotate the PISA lever 214 in a counter-clockwise direction against the biasing torque applied by the park return spring 218 until the PISA lever 214 encounters end stops (not shown) which limit the rotation of the PISA lever 214 from further rotation beyond the out of park configuration illustrated in FIG. 4A. After reaching the end stops in the out of park configuration, the position sensor 226 generates a signal indicating that the out of park configuration has been achieved and in response both of the park inhibit solenoids 220 are energized such that their respective solenoid shaft 222 contacts the PISA lever 214 with sufficient force to hold the PISA lever 214 in that position against the biasing force of the park return spring 218. As explained above, having a pair of separate and independently controlled park inhibit solenoids 220 provides redundancy which ensures that failure of either one does not result in an inadvertent entry into a park configuration.

When desired to move back to the park configuration, the two park inhibit solenoids 220 are de-energized. The biasing torque applied by the park return spring 218 is sufficient to cause the PISA lever 214 to rotate in a clockwise direction such that the solenoid shaft ramps 224 on the PISA lever 214 pushes the solenoid shafts 222 into a withdrawn position within the respective park inhibit solenoid 220. The park return spring 218 is strong enough to bias the PISA lever 214 in a clockwise direction even if one or both of the solenoid shafts 222 become stuck in an extended position to push the stuck solenoid shaft(s) 222 into its respective withdrawn position. Once in the park configuration, the PISA lever 214, through its connection to the park lever 216 via the pivot shaft 212, maintains the park actuator system 202 in the park configuration. Optionally, the motor 204 may also be energized to encourage rotation of the PISA lever 214 in the clockwise direction and thereby assist the park return spring 218.

In this manner, even in a situation where power may be lost to the entire system, the park return spring 218 ensures that the park control system 200 achieves the park configuration. Further, in those situations where we want to ensure that the park control system 200 stays in an out of park configuration, single element failure does not result in entry into the park configuration. The redundant, separate and independently controlled park inhibit solenoids 220 ensure that single failure of any one of those elements does not result in undesirable entry into the park configuration. Finally, the motor 204 provides the ability to control when the park control system 200 enters into either configuration, whether it is an out of park configuration or a park configuration.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A vehicle comprising:
   a prime mover in communication with an input shaft of a transmission;
   an output shaft of the transmission in communication with a final drive and drive wheels;
   a park actuator system internal to a housing of the transmission; and
   a park control system mounted to an external surface of the housing of the transmission with a pivot shaft extending through the housing that connects to the park actuator system to selectively place the park actuator system in one of a park configuration and an out of park configuration, wherein the park control system comprises a pair of separate and independently operable park inhibit solenoids that are operable to hold the park control system in an out of park configuration, wherein the park control system further comprises a lever pivotally mounted on the pivot shaft, wherein the park control system further comprises a position sensor mounted on the pivot shaft that outputs a signal indicating when the lever is in the out of park configuration, and wherein the park inhibit solenoids are responsive to the signal from the position sensor indicating an out of park configuration for the lever to energize and hold their corresponding solenoid shafts in an extended position.

2. The vehicle of claim 1, wherein each of the pair of park inhibit solenoids are energizable to hold their corresponding solenoid shafts in an extended position to prevent rotation of the lever from the out of park configuration toward a park configuration.

3. The vehicle of claim 2, wherein the lever comprises a solenoid shaft ramp that is oriented to push a corresponding solenoid shaft to a withdrawn configuration when the lever rotates from the out of park configuration toward the park configuration.

4. The vehicle of claim 1, wherein the park control system further comprises a park return spring that biases the lever to rotate from the out of park configuration to the park configuration.

5. The vehicle of claim 1, wherein the park control system further comprises:
a motor with an output shaft;
a pinion gear mounted on the output shaft;
a gear meshing with the pinion gear and mounted on the pivot shaft.

6. A park controller for a vehicle comprising:
a park actuator system internal to a housing of a transmission of the vehicle;
a park control system mounted to an external surface of the housing of the transmission with a pivot shaft extending through the housing that connects to a park actuator system internal to the housing to selectively place the park actuator system in one of a park configuration and an out of park configuration;
a pair of separate and independently operable park inhibit solenoids that are operable to hold the park control system in an out of park configuration;
a lever pivotally mounted on the pivot shaft; and
a position sensor mounted on the pivot shaft that outputs a signal indicating when the lever is in the out of park configuration, wherein the park inhibit solenoids are responsive to the signal from the position sensor indicating an out of park configuration for the lever to energize and hold their corresponding solenoid shafts in an extended position.

7. The park controller of claim 6, wherein each of the pair of park inhibit solenoids are energizable to hold their corresponding solenoid shafts in an extended position to prevent rotation of the lever from the out of park configuration toward a park configuration.

8. The park controller of claim 7, wherein the lever includes a solenoid shaft ramp that is oriented to push a corresponding solenoid shaft to a withdrawn configuration when the lever rotates from the out of park configuration toward the park configuration.

9. The park controller of claim 6, further comprising a park return spring that biases the lever to rotate from the out of park configuration to the park configuration.

10. The park controller of claim 6, further comprising:
a motor with an output shaft;
a pinion gear mounted on the output shaft;
a gear meshing with the pinion gear and mounted on the pivot shaft.

* * * * *